United States Patent Office 3,270,026
Patented August 30, 1966

3,270,026
SUBSTITUTED BENZAMIDOTETRAHYDRO-
PYRIDINES AND PROCESSES
Leo Berger and John Lee, Montclair, N.J., assignors to
Hoffmann-La Roche Inc., Nutley, N.J., a corporation of
New Jersey
No Drawing. Filed July 3, 1963, Ser. No. 292,749
10 Claims. (Cl. 260—295)

The present invention relates to substituted benzamidotetrahydropyridines. More particularly, the present invention relates to substituted benzamido-1,2,5,6-tetrahydropyridines and to processes for their preparation.

The substituted benzamido-1,2,5,6-tetrahydropyridines of the invention have the formula

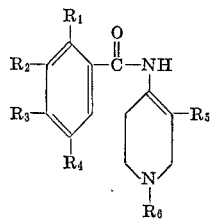

(I)

wherein $R_1$, $R_2$, $R_3$ and $R_4$ are hydrogen halogen, e.g., F, Cl, or Br, lower alkyl, lower alkoxy, trifluoromethyl, nitro, or a lower alkylamino or phenyl-lower alkylamino group, e.g., benzylamino, and $R_5$ and $R_6$ are lower alkyl, phenyl lower alkyl, or cycloalkyl. $R_1$, $R_2$, $R_3$ and $R_4$ can be the same or different and $R_5$ and $R_6$ can be the same or different.

The invention also relates to acid addition salts of the compounds of Formula I with pharmaceutically acceptable acids.

In the above Formula I, lower alkyl and the lower alkyl portion of lower alkoxy and phenyl-lower alkyl is to be understood to include lower alkyl groups having from 1 to 7 carbon atoms and can be either straight or branched chain groups, e.g., methyl, ethyl, propyl, butyl, isobutyl, tertiary butyl, hexyl, heptyl, etc.

Preferred compounds are those wherein $R_1$ is hydrogen, halogen, lower alkyl, or lower alkoxy; $R_2$ is hydrogen, halogen, lower alkoxy, trifluoromethyl, or nitro; $R_3$ is hydrogen, halogen, lower alkyl, lower alkoxy, trifluoromethyl, nitro, lower alkylamino, or phenyl-lower alkylamino; and $R_5$ and $R_6$ have the meaning given above; i.e., the preferred compounds of the invention have the formula

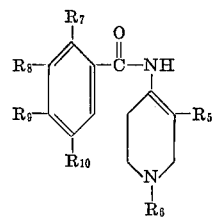

(II)

wherein $R_7$ is hydrogen, halogen, lower alkyl, or lower alkoxy; $R_8$ is hydrogen, halogen, lower alkoxy, trifluoromethyl, or nitro; $R_9$ is hydrogen, halogen, lower alkyl, lower alkoxy, trifluoromethyl, nitro, lower alkylamino, or phenyl-lower alkylamino; $R_{10}$ is hydrogen or lower alkoxy; and $R_5$ and $R_6$ have the meaning given above.

Compounds of Formula I exhibit analgesic, antipyretic, and psycho-stimulant activities and are useful as analgesic, antipyretic, and psycho-stimulant agents.

The substituted benzamido-1,2,5,6-tetrahydropyridines of Formula I are prepared by reacting a substituted benzamide of the formula

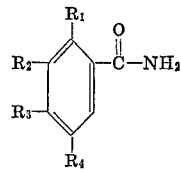

(III)

or a nitrile of the formula

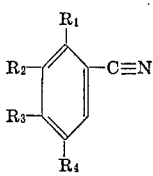

(IIIa)

wherein $R_1$ through $R_4$ have the meaning given above with a substituted 4-piperidone of the formula

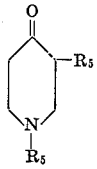

(IV)

wherein $R_5$ and $R_6$ have the meaning given above in the presence of either sulfuric acid or a mixture of phosphorus pentoxide and ortho-phosphoric acid. A mixture of phosphorus pentoxide and ortho-phosphoric acid is preferred. In general, from about 2.5 to about 10, preferably from about 5 to about 6 parts by weight of phosphorus pentoxide, and from about 2.5 to about 10.0, preferably from about 5 to about 6 parts by weight of ortho-phosphoric acid is employed, based on weight of substituted benzamide or benzonitrile used. The phosphoric acid can be anhydrous, but preferably a small quantity of water is present, i.e. up to about 15 percent water, e.g., 85 percent phosphoric acid. The reaction is carried out at a temperature in the range of from about 50 to about 160°, preferably from about 80 to about 110° C. When sulfuric acid is employed, the sulfuric acid can contain from up to about 2 percent water. From about 0.85 to about 1.2 parts by weight of sulfuric acid, based on the weight of substituted benzamide or benzonitrile can be employed. When sulfuric acid is used an organic solvent, e.g., chloroform, is preferably employed for carrying out the reaction. Other solvents that can be employed include carbon tetrachloride, methylene chloride, benzene, heptane, etc.

The compound of Formula I is isolated from the above reaction mixture by neutralizing the reaction mixture with alkali, preferably in aqueous solution, which precipitates the product, and then removing the product from the neutralized aqueous solution, e.g., by filtration.

The invention will be better understood from the following examples which are given for illustration purposes only and are not meant to limit the invention.

Example 1.—*Preparation of 1,2,5,6-tetrahydro-1,3-dimethyl-4-(4-nitrobenzamido)pyridine*

A solution of phosphorus pentoxide in 85 percent phosphoric acid is prepared as follows: 300 g. of phosphorus pentoxide is placed in a 2-liter, 3-necked flask and with constant stirring (Teflon blade), and 300 g. of 85 percent phosphoric acid is added with caution. The solution heats up to 200–250° spontaneously. When the initial exothermic reaction subsides, the reaction mixture is heated externally (200–250°) with constant stirring until a clear viscous solution is obtained. The solution is then cooled to room temperature with constant stirring.

To the above solution of phosphorus pentoxide in 85 percent phosphoric acid is added, at room temperature and with constant stirring, 100 g. of powdered p-nitrobenzamide and 100 g. of 1,3-dimethylpiperidone-4 in that order. The reaction mixture warms spontaneously to 65–70°. Upon completion of the addition, the reaction mixture heated at 100° for 10 hours with constant stirring and then cooled to 25–40°.

To this cooled viscous solution, approximately 500 cc. of warm water (40–60°) is added with constant stirring and stirred for 15 minutes, and then the reaction mixture is poured with stirring onto a mixture of 1 liter of water mixed with approximately 1 liter of ice. A small amount of insoluble material is filtered off on a sintered glass funnel.

To this clear acid solution, sodium hydroxide flakes are added (with ice chips, from time to time, to control the heat of neutralization) until the solution is basic to phenolphthalein. The basic product is obtained as a yellow solid and is collected on a sintered glass funnel and washed with large amounts of water to remove the adsorbed alkali.

The solid base obtained is dried on porous clay plates and ground to a fine powder. There is obtained a crude product, 1,2,5,6-tetrahydro - 1,3 - dimethyl-4-(4-nitrobenzamido)pyridine, melting at 160–162°. One recrystallization from 15 volumes of acetone (or ethyl acetate) raises the melting point to 163–165°.

*Example 2.—Preparation of 1,2,5,6-tetrahydro-1,3-dimethyl-4-(4-nitrobenzamido)pyridine hydrochloride*

100 g. of 1,2,5,6-tetrahydro-1,3-dimethyl-4-(4-nitrobenzamido)pyridine is dissolved in 10 volumes of warm ethanol. A solution of HCl in ethanol is added until the mixture is acid to Congo paper (i.e. 41.0 cc. of a 9.5 N ethanolic HCl solution). The solution is concentrated to one-half volume (approximately 500 cc.), and set aside for crystallization at ice-bath temperature. After 5 hours, the crystallization is complete and the light yellow crystalline product is collected by filtration, washed with acetone and air dried. The product is finely powdered and dried in vacuo over conc. $H_2SO_4$ or $P_2O_5$ overnight. There is obtained 80 g. of pure product, 1,2,5,6-tetrahydro - 1,3-dimethyl-4-(4-nitrobenzamido)pyridine hydrochloride, melting at 200–201° after sintering at 195–200°. (If further purification is necessary, acetone is the solvent of choice.) Additional product can be recovered from the mother liquors.

A stable non-hygroscopic hydrate melting at 146.5–147.5° C. is prepared by dissolving the hydrochloride salt in water and evaporating the solution to dryness at 25°–40° C. in vacuo. The residue is then crystallized with acetone and water to give the pure monohydrate salt.

*Example 3.—Preparation of N-(1,2,5,6-tetrahydro-1,3-dimethyl-4-pyridyl)veratramide*

To a solution of 100 g. of phosphorus pentoxide in 100 g. of 85 percent phosphoric acid prepared in the manner described for Example 1 are added 19.0 g. of 3,4-dimethoxybenzamide and 19.0 g. of 1,3-dimethylpiperidone-4. The reaction mixture is heated for 10 hours at 100° and worked up as in Example 1.

As the base obtained does not crystallize spontaneously, the product that separates is dissolved in chloroform, the chloroform solution is washed with water, dried over anhydrous $K_2CO_3$ overnight, filtered from the drying agent, and concentrated to dryness. There is obtained a solid base, N-(1,3,5,6-tetrahydro-1,3-dimethyl-4-pyridyl)veratramide, melting at 147–150° after sintering at 144°. After crystallization from acetone and Skellysolve "B," the pure base melts at 150–152°.

The base is converted to a crystalline sulfate salt melting at 197–199° after crystallization from acetone and ether.

*Example 4.—Preparation of 4-(4-aminobenzamido)-1,2,5,6-tetrahydro-1,3-dimethylpyridine*

10 g. of 1,2,5,6-tetrahydro-1,3-dimethyl-4-(4-nitrobenzamido)pyridine is dissolved in 180 ml. of methanol and 500 mg. of platinum oxide is added. The mixture is shaken in a "Parr bomb" under 3.7 atm. of hydrogen for 1 hour. There is no external heating during the reaction. The catalyst is filtered off through hyflo and the filtrate concentrated under reduced pressure on a water bath. Following recrystallization from acetone, the melting point of the product, 4-(4-aminobenzamido)-1,2,5,6-tetrahydro-1,3-dimethylpyridine, is 168–170°.

*Example 5.—Preparation of 4-(4-benzylaminobenzamido)-1,2,5,6-tetrahydro-1,3-dimethylpyridine*

A mixture of 6 g. of 4-(4-aminobenzamido-1,2,5,6-tetrahydro-1,3-dimethylpyridine, 300 ml. of benzene and 10 g. of benzaldehyde are refluxed and stirred for 6 hours. During the reaction, 0.5 ml. of water is removed by means of a Dean-Stark receiving trap. After the reaction mixture cools to room temperature, it is filtered and the precipitate dried; M.P. 153–154°. The dry solid is dissolved in methanol and the solution heated to reflux. 4 g. of sodium borohydride dissolved in 50 ml. of cold methanol is added as rapidly as the evolution of hydrogen from the reaction permits. When the addition is over, the solution is refluxed and stirred for an additional 1¼ hours, cooled to room temperature and decomposed with water. The product is extracted with chloroform. The chloroform solution is dried over sodium sulfate, the desiccant filtered off, and the chloroform removed under reduced pressure on a water bath. The residue, 4 - (4-benzylaminobenzamido)-1,2,5,6-tetrahydro-1,3-dimethylpyridine, is crystallized from nitromethane; M.P. 126–127°.

*Example 6.—Preparation of 4-(4-chlorobenzamido)-1,2,5,6-tetrahydro-1,3-dimethylpyridine*

To a solution of 50 g. of phosphorus pentoxide in 50 g. of 85 percent phosphoric acid are added 10.0 g. of p-chlorbenzonitrile and 10.0 g. of 1,3-dimethylpiperidone-4. The reaction mixture is then heated for 10 hours at 100° and worked up according to the process of Example 1. About 12.0 g. of a crystalline base melting at 149–151° is obtained. Further purification by recrystallization from 14 volumes of acetone gives 10.3 g. of pure base, 4 - (4-chlorobenzamido)-1,2,5,6-tetrahydro-1,3-dimethylpyridine, melting at 150–152°.

*Example 7.—Preparation of 4-benzamido-1,2,5,6-tetrahydro-1,3-dimethylpyridine*

To a solution of 50 g. of phosphorus pentoxide in 50 g. of 85 percent phosphoric acid are added 10.0 g. of benzamide and 10.0 g. of 1,3-dimethylpiperidone-4. The reaction mixture is then heated for 10 hours at 100° and worked up according to the process of Example 1. 7.5 g. of a crude base that melts at 171–173° is isolated. Recrystallized from 25 volumes of acetone, pure product, 4 - benzamido-1,2,5,6-tetrahydro-1,3-dimethylpyridine, is obtained melting at 175–177°.

*Example 8.—Preparation of N-(1,2,5,6-tetrahydro-1,3-dimethyl-4-pyridyl)-p-toluamide*

To a solution of 50 g. of phosphorus pentoxide in 50 g. of 85 percent phosphoric acid prepared in the manner described in Example 1 are added 10 g. of p-toluic nitrile and 10 g. of 1,3-dimethylpiperidone-4. The reaction mixture is heated for 10 hours at 100°, and worked up according to the method of Example 1. The product melts at 139–142°. Recrystallization from 10 volumes of ethyl acetate gives the product, N-(1,2,5,6-tetrahydro-1,3 - dimethyl - 4 - pyridyl)-p-toluamide, melting at 142–144°.

Example 9.—Preparation of N-(1,2,5,6-tetrahydro-1,3-dimethyl-4-pyridyl)-o-toluamide To a solution of 75 g. of phosphorus pentoxide in 75 g. of 85 percent phosphoric acid are added 20 g. of o-tolunitrile and 20 g. of 1,3-dimethylpiperidone-4 and the mixture is heated at 100° for 10 hours. The reaction mixture is then worked up according to the process of Example 1. There is obtained 7.8 g. of crude base, N-(1,2,5,6 - tetrahydro-1,3-dimethyl-4-pyridyl)-o-toluamide, melting at 120–124°. Recrystallized from 5 volumes of acetone gives pure product melting at 123–125°.

Example 10.—Preparation of 1,2,5,6-tetrahydro-1,3-dimethyl-(3,4,5-trimethoxybenzamido)pyridine To a solution of 50 g. of phosphorus pentoxide in 50 g. of 85 percent phosphoric acid are added 10.5 g. of 3,4,5-trimethoxybenzamide and 8.5 g. of 1,3-dimethylpiperidone-4 and the mixture heated at 100° for 10 hours. The reaction mixture is then worked up according to the process of Example 1. There is obtained 2.0 g. of solid base melting at 165–168°. Recrystallization from 15 volumes of ethyl acetate, gives pure product, 1,2,5,6-tetrahydro - 1,3 - dimethyl-(3,4,5-trimethoxybenzamido) pyridine, melting at 168–170°.

Example 11.—Preparation of 4-(3-chlorobenzamido)-1,2,5,6-tetrahydro-1,3-dimethylpyridine To a solution of 50 g. of phosphorus pentoxide in 50 g. of 85 percent phosphoric acid are added 10 g. of meta-chlorobenzamide and 10 g. of 1,3-dimethylpiperidone-4. The reaction mixture is then heated with stirring for 10 hours at 100° and worked up according to the process of Example 1. About 13 g. of a crude crystalline base is obtained that melts at 123–124° when crystallized from acetonitrile. Further purification by recrystallization from acetone gives 5.0 g. of the pure base, 4-(3-chlorobenzamido) - 1,2,5,6 - tetrahydro-1,3-dimethylpyridine, melting at 122–123°. Additional base is obtained by concentration of the acetone mother liquors.

Example 12.—Preparation of N-(1,2,5,6-tetrahydro-1,3-dimethyl-4-pyridyl)-p-anisamide To a solution of 50 g. of phosphorus pentoxide in 50 g. of 85 percent phosphoric acid are added 10 g. of anisonitrile and 10 g. of 1,3-dimethylpiperidone-4. The reaction mixture is stirred and heated at 100° for 10 hours and worked up according to the process of Example 1. A crystalline base, N-(1,2,5,6-tetrahydro-1,3-dimethyl-4-pyridyl)-p-anisamide, is obtained that is purified by recrystallization from acetone and melts at 139–140°.

Example 13.—Preparation of 1,2,5,6-tetrahydro-1,3-dimethyl-4-(3-nitrobenzamido)pyridine To a solution of 75 g. of phosphorus pentoxide in 75 g. of 85 percent phosphoric acid are added 14.8 g. of m-nitrobenzonitrile and 15.0 g. of 1,3-dimethylpiperidone-4. The reaction mixture is heated with stirring for 10 hours at 100° and then worked up according to the process of Example 1. There is obtained 13.5 g. crude base melting at 135–137°. One recrystallization from 10 volumes of ethyl acetate gives 10.8 g. of pure base, 1,2,5,6-tetrahydro-1,3-dimethyl - 4 - (3-nitrobenzamido)pyridine, melting at 137–139°.

Example 14.—Preparation of 4-(2-chloro-4-nitrobenzamido)-1,2,5,6-tetrahydro-1,3-dimethylpyridine To a solution of 100 g. of phosphorus pentoxide in 100 g. of 85 percent phosphoric acid are added 20 g. of 2-chloro-4-nitrobenzamide and 15.0 g. of 1,3-dimethylpiperidone-4. The reaction mixture is stirred and heated for 10 hours at 100° and then worked up according to the process of Example 1. 19.8 g. of a crude base is obtained that melts at 179–181°. The base, 4-(2-chloro-4-nitrobenzamido) - 1,2,5,6 - tetrahydro - 1,3 - dimethylpyridine, is purified via crystallization from ethyl acetate and methanol, and finally from 20 volumes of acetone. The pure base melts at 179–181°.

Example 15.—Preparation of 4-(4-ethoxybenzamido)-1,2,5,6-tetrahydro-1,3-dimethylpyridine To a solution of 100 g. phosphorus pentoxide in 100 g. of 85 percent phosphoric acid are added 16.5 g. of p-ethoxybenzamide and 15.0 g. of 1,3-dimethylpiperidone-4. The reaction mixture is stirred and heated for 10 hours at 100° and then worked up according to the process of Example 1. Crude base, melting point 156–159°, is obtained. Recrystallization from 10 volumes of ethyl acetate gives the pure base, 4-(4-ethoxybenzamido)-1,2,5,6-tetrahydro-1,3-dimethylpyridine, melting at 158–159°.

Example 16.—Preparation of 4-(4-chloro-3-nitrobenzamido)-1,2,5,6-tetrahydro-1,3-dimethylpyridine To a solution of 100 g. of phosphorus pentoxide in 100 g. of 85 percent phosphoric acid are added 20 g. of 4-chloro-3-nitrobenzamide and 15.0 g. of 1,3-dimethylpiperidone-4. The reaction mixture is heated with stirring at 100° for 10 hours and then worked up according to the process of Example 1. Crude base, melting at 138–140°, is obtained. One recrystallization from 10 volumes of ethyl acetate gives pure base, 4-(4-chloro-3-nitrobenzamido) - 1,2,5,6 - tetrahydro - 1,3 - dimethylpyridine, melting at 139–140°.

Example 17.—Preparation of $\alpha,\alpha,\alpha$-trifluoro-N-(1,2,5,6-tetrahydro-1,3-dimethyl-4-pyridyl)-p-toluamide To a solution of 75 g. of phosphorus pentoxide in 75 g. of 85 percent phosphoric acid are added 15 g. of p-trifluoromethylbenzamide and 15.0 g. of 1,3-dimethylpiperidone-4. The reaction mixture is stirred and heated at 100° for 10 hours and then worked up according to the process of Example 1. There is obtained crude base, $\alpha,\alpha,\alpha$ - trifluoro - N - (1,2,5,6 - tetrahydro - 1,3 - dimethyl-4-pyridyl)-p-toluamide, melting at 152–154°. Recrystallization from acetone and finally 10 volumes of ethyl acetate did not alter the melting point.

Example 18.—Preparation of $\alpha,\alpha,\alpha$-trifluoro-N-(1,2,5,6-tetrahydro-1,3-dimethyl-4-pyridyl)-m-toluamide To a solution of 75 g. of phosphorus pentoxide in 75 g. of 85 percent phosphoric acid are added 15.0 g. of m-trifluoromethylbenzonitrile and 15.0 g. of 1,3-dimethylpiperidone-4. The reaction mixture is heated with stirring at 100° for 10 hours and worked up according to the process of Example 1. There is obtained crude base that melts at 110–115°. Recrystallization from 10 volumes of ethyl acetate gives pure base, $\alpha,\alpha,\alpha$-trifluoro-N-(1,2,5,6-tetrahydro - 1,3 - dimethyl - 4 - pyridyl) - m - toluamide, melting at 113–115°.

Example 19.—Preparation of 4-(4-fluorobenzamido)-1,2,5,6-tetrahydro-1,3-dimethylpyridine To a solution of 75 g. of phosphorus pentoxide in 75 g. of 85 percent phosphoric acid are added 15.0 g. of p-fluorobenzamide and 13.0 g. of 1,3-dimethylpiperidone-4. The reaction mixture is heated with stirring at 100° for 10 hours and worked up according to the process of Example 1. An insoluble base is obtained that melts at 142–145° after being air dried. One recrystallization from ethyl acetate gives the pure base, 4-(4-fluorobenzamido)-1,2,5,6 - tetrahydro - 1,3 - dimethylpyridine, melting at 148–150°.

Example 20.—Preparation of 3-butyl-1,2,5,6,-tetrahydro-1-methyl-4-(4-nitrobenzamido)pyridine To a solution of 50 g. of phosphorus pentoxide in 50 g. of 85 percent phosphoric acid are added 10.0 g. of p-nitrobenzamide and 12.0 g. of 3-butyl-1-methylpiperidone-4.

The reaction mixture is heated with stirring at 100° for 10 hours and worked up according to the process of Example 1. The crude base obtained, 3-butyl-1,2,5,6-tetrahydro - 1 - methyl - 4 - (4 - nitrobenzamido)pyridine, melts at 133–135°. One recrystallization from ethyl acetate gives pure base melting at 135–136°.

*Example 21.—Preparation of 3-benzyl-1,2,5,6-tetrahydro-1-methyl-4-(4-nitrobenzamido)pyridine*

To a solution of 50 g. of phosphorus pentoxide in 50 g. of 85 percent phosphoric acid are added 17.0 g. of p-nitrobenzamide and 21.0 g. of 3-benzyl-1-methylpiperidone-4. The reaction mixture is stirred and heated at 100° for 10 hours and worked up according to the process of Example 1. There is obtained 3.4 g. of a pale green base, 3-benzyl-1,2,5,6 - tetrahydro - 1 - methyl - 4 - (4 - nitrobenzamido) pyradine, melting at 147–148°. Recrystallized from 10 volumes of ethyl acetate gives product melting at 150–152°.

*Example 22.—Preparation of 1-benzyl-1,2,5,6-tetrahydro-3-methyl-4-(4-nitrobenzamido)pyridine*

To a solution of 50 g. of phosphorus pentoxide in 50 g. of 85 percent phosphoric acid are added 6.5 g. of p-nitrobenzamide and 8.0 g. of 1-benzyl-3-methylpiperdone-4. The reaction mixture is heated with stirring at 100° for 10 hours and worked up according to the process of Example 1. There is obtained crude base, 1-benzyl-1,2,5,6-tetrahydro - 3 - methyl - 4 - (4 - nitrobenzamido)pyridine, melting at 148–151°. Recrystallized from 8 volumes of ethyl acetate gives pure product melting at 153–154°.

*Example 23.—Preparation of 1,2,5,6-tetrahydro-3-methyl-4-(4-nitrobenzamido)-1-phenethylpyridine*

To a solution of 50 g. of phosphorus pentoxide in 50 g. of 85 percent phosphoric acid are added 7.0 g. of p-nitrobenzamide and 10.0 g. of 3-methyl-1-phenethylpiperidone-4. The reaction mixture is heated with stirring for 10 hours at 100° and worked up according to the process of Example 1. A solid base, 1,2,5,6-tetrahydro-3-methyl-4-(4-nitrobenzamido)-1-phenethylpyridine, is obtained that melts at 161–164°. Recrystallization from 10 volumes of ethyl acetate gives pure product melting at 162–163°.

*Example 24.—Preparation of 1-cyclohexyl-1,2,5,6-tetrahydro-3-methyl-4-(4-nitrobenzamido)pyridine*

To a solution of 50 g. of phosphorus pentoxide in 50 g. of 85 percent phosphoric acid are added 5.2 g. of p-nitrobenzamide and 5.2 g. of 1-cyclohexyl-3-methylpiperidone-4. The reaction mixture is heated with stirring for 10 hours at 100° and worked up according to the process of Example 1. A solid base, 1-cyclohexyl-1,2,5,6-tetrahydro-3 - methyl - 4 - (4 - nitrobenzamido)pyridine, is obtained that melts at 174.5–175.5° after crystallization from ethyl acetate.

*Example 25.—Preparation of 1 - tert. - butyl - 1,2,5,6-tetrahydro-3-methyl-4-(4-nitrobenzamido)pyridine*

To a solution of 50 g. of phosphorus pentoxide in 50 g. of 85 percent phosphoric acid are added 10 g. of p-nitrobenzamide and 10 g. of 1-tert.-butyl-3-methylpiperidone-4. The reaction mixture is heated with stirring for 10 hours at 100° and worked up according to the process of Example 1. A solid base, 1-tert.-butyl-1,2,5,6-tetrahydro-3-methyl-4-(4-nitrobenzamido)pyridine, is obtained that melts at 197–199°. One recrystallization from acetone gives pure product melting at 199–201°.

*Example 26.—Preparation of N-(1,2,5,6-tetrahydro-1,3-dimethyl-4-pyridyl)-m-anisamide*

To a solution of 50 g. of phosphorus pentoxide in 50 g. of 85 percent phosphoric acid are added 10.0 g. of m-methoxybenzamide and 10.0 g. of 1,3-dimethylpiperidone-4. The reaction mixture is heated with stirring at 100° for 10 hours and worked up according to the process of Example 1. There is obtained 5.8 g. of a solid base, N-(1,2,5,6 - tetrahydro - 1,3 - dimethyl - 4 - pyridyl) - m-anisamide, melting at 109–110° after crystallization from ethyl acetate. Recrystallization from five volumes of ethyl acetate gives pure product melting at 109–110°.

We claim:
1. A compound selected from the group consisting of
(a) a compound of the formula

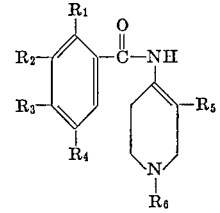

wherein:
$R_1$, $R_2$ and $R_4$ are each independently selected from the group consisting of hydrogen, halogen, lower alkyl, lower alkoxy, trifluoromethyl and nitro;
$R_3$ is selected from the group consisting of hydrogen, halogen, lower alkyl, lower alkoxy, trifluoromethyl, nitro, lower alkylamino and phenyl lower alkylamino;
$R_5$ is selected from the group consisting of lower alkyl and benzyl and
$R_6$ is selected from the group consisting of lower alkyl, phenyl lower alkyl and cyclohexyl
and (b) an acid addition salt thereof with a pharmaceutically acceptable acid.

2. A compound of the formula

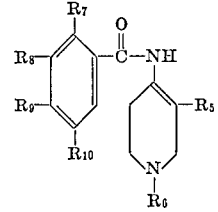

(II)

wherein:
$R_7$ is selected from the group consisting of hydrogen, halogen, lower alkyl, and lower alkoxy;
$R_8$ is selected from the group consisting of hydrogen, halogen, lower alkoxy, trifluoromethyl, and nitro;
$R_9$ is selected from the group consisting of hydrogen, halogen, lower alkyl, lower alkoxy, trifluoromethyl, nitro lower alkylamino, and phenyl-lower alkylamino;
$R_{10}$ is selected from the group consisting of hydrogen and lower alkoxy;
$R_5$ is selected from the group consisting of lower alkyl and benzyl and
$R_6$ is selected from the group consisting of lower alkyl, phenyl-lower alkyl and cyclohexyl.

3. 1,2,5,6 - tetrahydro - 1,3 - dimethyl - 4 - (4 - nitrobenzamido)pyridine and acid addition salts thereof with pharmaceutically acceptable acids.

4. 4 - (4 - benzylaminobenzamido) - 1,2,5,6 - tetrahydro-1,3-dimethylpyridine, and acid addition salts thereof with pharmaceutically acceptable acids.

5. 4 - (4 - chlorobenzamido) - 1,2,5,6 - tetrahydro-1,3-dimethylpyridine, and acid addition salts thereof with pharmaceutically acceptable acids.

6. 4 - benzamido - 1,2,5,6 - tetrahydro - 1,3 - dimethylpyridine, and acid addition salts thereof with pharmaceutically acceptable acids.

7. A process for the preparation of a compound of the formula

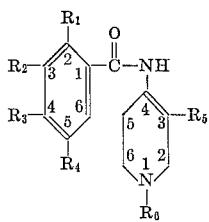

(I)

wherein:
R₁, R₂ and R₄ are each independently selected from the group consisting of hydrogen, halogen, lower alkyl, lower alkoxy, trifluoromethyl and nitro;
R₃ is selected from the group consisting of hydrogen, halogen, lower alkyl, lower alkoxy, trifluoromethyl, nitro, lower alkylamino and phenyl lower alkylamino;
R₅ is selected from the group consisting of lower alkyl and benzyl and
R₆ is selected from the group consisting of lower alkyl, phenyl lower alkyl and cyclohexyl, comprising the steps of reacting a compound selected from the group consisting of (a) a compound of the formula

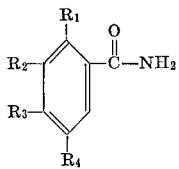

(III)

and (b) a compound of the formula

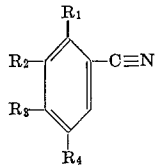

(IIIa)

wherein:
R₁ through R₄ have the above meaning with a compound of the formula

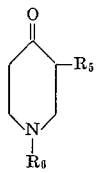

(IV)

wherein:
R₅ and R₆ have the above meaning in the presence of a substance selected from the group consisting of
(a) a mixture of phosphorus pentoxide and phosphoric acid, and
(b) sulfuric acid,
and isolating a compound of Formula I from the reaction mixture.

8. A process according to claim 7 wherein the reaction is carried out at a temperature in the range of from about 50° to about 160° C.

9. A process according to claim 8 wherein from about 2.5 to about 10 parts by weight of phosphorus pentoxide and from about 2.5 to about 10 parts by weight of phosphoric acid are employed, based on the weight of the compound of Formula III or IIIa.

10. A process according to claim 9 wherein the product is isolated from the reaction mixture by neutralization of the reaction mixture with an alkali in the presence of water to precipitate a compound of Formula I and separating the precipitate from the neutralization mixture.

No references cited.

WALTER A. MODANCE, *Primary Examiner.*

A. L. ROTMAN, *Assistant Examiner.*